UNITED STATES PATENT OFFICE.

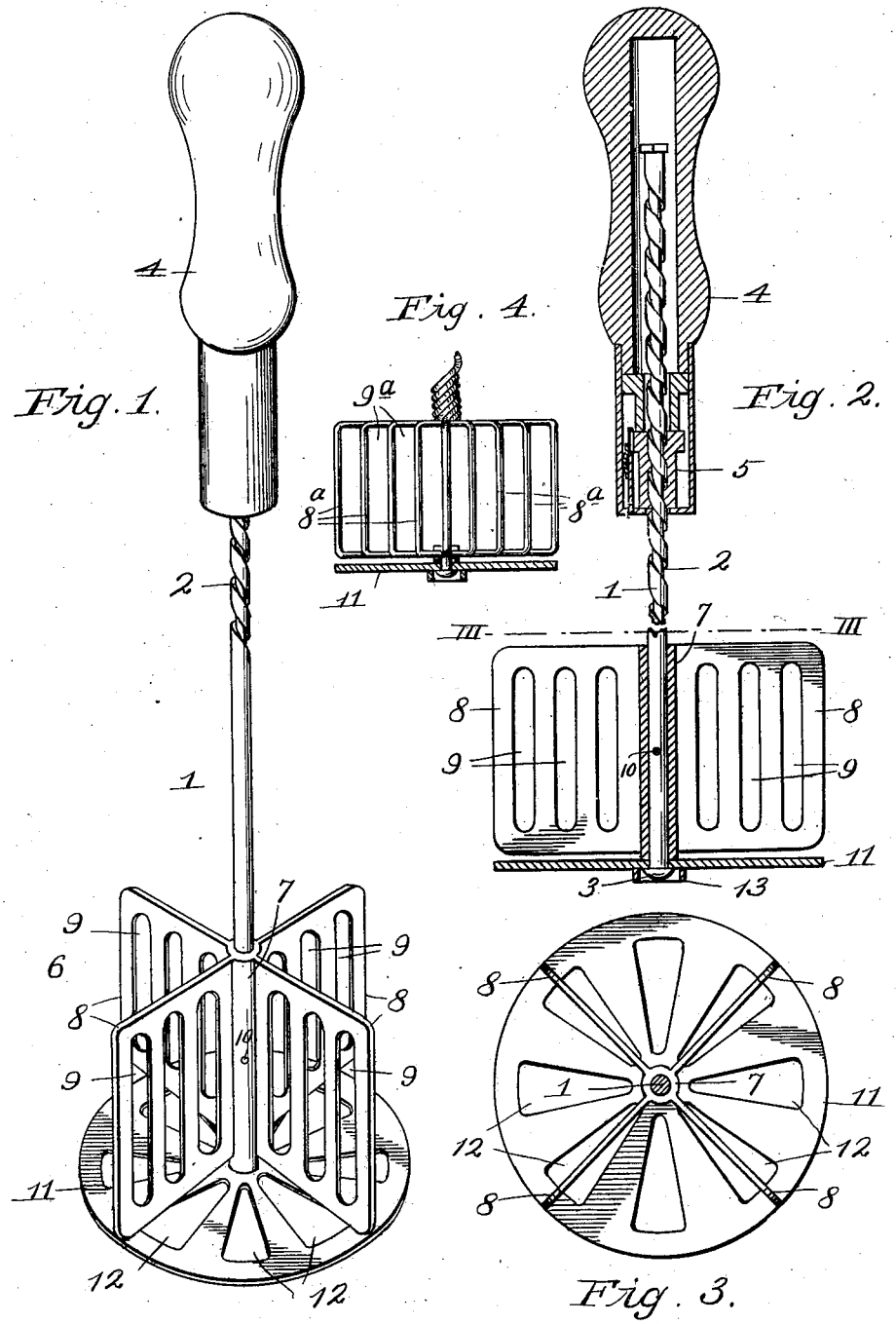

ANNA F. NEWTON, OF MADISON, KANSAS.

KITCHEN UTENSIL.

No. 861,603.

Specification of Letters Patent.

Patented July 30, 1907.

Application filed May 21 1907. Serial No. 374,885.

*To all whom it may concern:*

Be it known that I, ANNA F. NEWTON, a citizen of the United States, residing at Madison, in the county of Greenwood and State of Kansas, have invented certain new and useful Improvements in Kitchen Utensils, of which the following is a specification.

My invention relates to improvements in kitchen utensils; and my object is to provide a simple and inexpensive device for mashing vegetables, fruits, &c., and mixing dough while in a semiliquid state, and for whipping eggs to a frosting.

The invention resides in the novel construction, combination, and arrangement of parts whereby both a mashing and a whipping or beating action are simultaneously obtained which render the device very effective, so that considerable work may be performed in a comparatively short space of time.

Referring now to the accompanying drawing which illustrates the invention:—Figure 1 represents a perspective view of the utensil ready for operation. Fig. 2 is a broken vertical section of same. Fig. 3 is a transverse section on line III—III of Fig. 2. Fig. 4 is a modified form of the lower portion of the utensil.

In carrying out the invention I employ a stem 1, provided at its upper portion with a spiral groove 2 and at its lower end with a rounded head 3.

4 designates a handle reciprocably mounted upon the upper portion of the stem and provided with a nut 5 engaging the spiral groove 2, for the purpose of rotating the stem when the handle is operated.

6 designates a beater consisting of a sleeve 7 and four vertical wings 8 radiating from the sleeve and arranged at right-angles to each other. Wings 8 have parallel vertical slots 9, as shown in Figs. 1 and 2. Sleeve 7 is fixed to the stem by a pin 10 so that it will rotate therewith.

11 designates a masher loosely mounted upon the lower end of the stem so that it will not turn therewith, and is provided with radial openings 12. It is arranged between head 3 and the lower end of sleeve 7, which extends beneath the wings so that the latter will not scrape upon the masher while rotating. Masher 11 is provided at its under central portion with an annular bearing 13, loosely surrounding head 3 and extending beneath the same, so that said head will be free to rotate with the stem while bearing 13 is resting in a dish or upon a table.

The slots in the masher are of great advantage in reducing the material to the desired fineness on account of the numerous edges presented around the interstices. This is also true of the beater which is rotated at a high rate of speed each time the handle is forced downwardly, and thus greatly assists in reducing the material to the desired fineness. When whipping eggs the beater alone is operated, and by its rapid rotation reduces eggs to frosting quicker and easier than this work can be performed with a spoon or fork.

Fig. 4 represents a modified form of beater consisting of wires $8^a$ having spaces $9^a$ between the same. This form of beater may be substituted when desired for the sheet metal beater 6.

Having thus described my invention, what I claim is:—

1. In a device of the character described, a stem provided with a spiral groove, a handle reciprocably mounted upon the upper portion of said stem, means carried by said handle for engaging the groove and rotating the stem, a beater fixed to the stem, and a perforated masher loosely mounted upon the stem immediately beneath the beater, substantially as described.

2. In a device of the character described, a rotary stem provided at its lower end with a rounded head, a handle reciprocably, mounted thereon, a beater fixed to the lower portion of the stem, and a circular perforated masher loosely mounted upon the stem beneath the beater and provided at its underside with an annular bearing loosely embracing the rounded head and extending below the same, for the purpose set forth and described.

In testimony whereof I affix my signature, in the presence of two witnesses.

ANNA F. NEWTON.

Witnesses:
J. H. WALKER,
L. E. WATROUS.